(12) United States Patent
Petrick et al.

(10) Patent No.: US 6,396,253 B1
(45) Date of Patent: May 28, 2002

(54) METHODS AND APPARATUS FOR AUTOMATED REPAIR DETECTION OF SOLID-STATE X-RAY DETECTORS

(75) Inventors: Scott W. Petrick, Sussex; Matthew E. Ellis, Waukesha, both of WI (US); Didier A. Verot, Versailles (FR); Donald E. Castleberry, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/443,733

(22) Filed: Nov. 19, 1999

(51) Int. Cl.[7] .................. G01R 31/02; G01R 31/08; G01R 1/04; G01N 27/00
(52) U.S. Cl. ............... 324/73.1; 324/158.1; 324/71.1; 324/522; 324/523; 324/527
(58) Field of Search ................ 324/73.1, 158.1, 324/71.1, 522, 523, 527; 378/207; 382/309; 349/55

(56) References Cited

U.S. PATENT DOCUMENTS

| | | | |
|---|---|---|---|
| 5,285,150 A | * | 2/1994 | Henley et al. ............. 324/73.1 |
| 5,303,074 A | | 4/1994 | Salisbury |
| 5,389,775 A | | 2/1995 | Kwasnick et al. |
| 5,391,985 A | * | 2/1995 | Henley ................... 324/158.1 |
| 5,463,322 A | | 10/1995 | Kwasnick et al. |
| 5,587,591 A | | 12/1996 | Kingsley et al. |

* cited by examiner

*Primary Examiner*—Safet Metjahic
*Assistant Examiner*—Wasseem H. Hamdan
(74) *Attorney, Agent, or Firm*—Carl B. Horton, Esq.; Armstrong Teasdale LLP

(57) ABSTRACT

A method for detecting cut data lines in an imaging array having a detector including an array of pixels for measuring radiation, and a plurality of data line contacts is provided. The method includes the steps of initializing pixels of the imaging array which includes a plurality of data lines including at least one uncut data line and at least one cut data line, wherein each cut data line is electrically connected to at least one of the plurality of data line contacts and at least one uncommitted contact. The method further includes determining a signal level for the uncut data lines, measuring a signal level of each data line in the plurality of data lines, and determining a number of cut data lines and a number of uncut data lines by using the signal levels received from each data line in the plurality of data.

23 Claims, 3 Drawing Sheets

METHODS AND APPARATUS FOR AUTOMATED REPAIR DETECTION OF SOLID-STATE X-RAY DETECTORS

BACKGROUND OF THE INVENTION

This invention relates generally to radiation imager arrays and more specifically to automated methods and apparatus for the repairs of such arrays.

Complex electronic devices are commonly formed on substrates in fabrication processes involving deposition and patterning of multiple layers of s conductive, semiconductive, and dielectric materials to form multiple individual electronic components. For example, large area imager arrays are fabricated on a wafer. These arrays contain photodiodes and circuitry for reading the output of the photodiodes. The circuitry includes scan (address) lines, data lines and switching components (e.g., field effect transistors (FETs)). In such an array, both scan and data lines are contacted using separate sets of contacts on the panel. Additionally, half of the drive electronics are connected to a set of contacts on the outer edge of the panel which connect to "odd" scan lines. Between these contacts and an active area of the panel are another set of contacts which connect to "even" scan lines. Sense electronics are on the remaining two sides of the panel. One set of sense electronics connects to all "odd" data lines on one side of the panel and the other set of sense electronics connects to "even" data lines on the opposite side. None of the scan or data lines are contacted on both sides of the panel.

Defects in such imager arrays can result from, among other causes, impurities in materials deposited to form the various components. One example of such an impurity-based defect is a short circuit between a data line and an underlying scan (address) line in the pixel array. Such short circuits disrupt the desired electrical connections between devices in the array and seriously degrade performance of one or more individual electronic components on the wafer, often to the point of making an entire wafer unusable. In order to improve the yield of flat panel X-Ray detectors, shorts between a scan line and a data line, which would normally result in both the data line and the scan line being unusable, are removed in a fashion that allows both the scan and the data line to be recovered with only a small number of pixels being lost in an immediate vicinity of the short. Generally two cuts are made on either side of the short on the line which can be most easily recovered (or "repaired").

Repair and recovery of data lines that have been cut on flat panel x-ray panels are made possible by addition of a small number of uncommitted contacts.

Uncommitted contacts are connected to a "free" end of a data line that has been cut in two places to remove a short. A free end of a data line in this instance refers to a cut end of a data line that is no longer attached to sense electronics on an opposite side because of the cut. Without recovery, data on this free end would normally be lost, representing loss of at least a partial (data) line for every short removed by cutting.

Uncommitted contacts on the opposite end can be used to short to the free end of a cut data line. In effect, a free end of an "odd" cut data line becomes a partial "even" data line by connection to an uncommitted contact on the end opposite where the "odd" sense electronics.

The uncommitted contacts are not connected to any data lines during fabrication, but are designed to allow a short between a free end of a cut data line and an uncommitted contact to be made easily on the panel. When a data line has been cut and is connected to an uncommitted contact, data from the free end of the cut data line will be displaced spatially in the resulting acquired image. Because this image is represented as an array of binary numbers in computer memory, displaced data can be re-mapped to its correct location in the image presented for diagnosis using simple computer-based replacement algorithms. A part of this process particular to each panel is a set of locations at which cuts have been made and which uncommitted contacts have been used to recover cut data lines. It has been suggested that during the process of test and repair, a file be created to record both locations of cuts and locations of uncommitted contacts which have been used to recover cut data lines.

This file would have to accompany the panel to a system that uses this panel to generate diagnostic quality x-ray images, to enable the system to reconstruct an image from the repaired panel. This data would be different for every panel.

Successfully transferring remapping information to end users can be difficult due to logistics. Loss of data in a remapping information file can occur for various reasons, for example, corruption of data in the file itself, or loss or destruction of the media. If the file is not successfully transferred, the file must be regenerated, or else the detector assembly may become useless scrap. It would therefore be desirable to provide methods and apparatus that would make transfer of remapping information files to end users unnecessary. It would also be desirable to automate this remapping at a site of an end user.

BRIEF SUMMARY OF THE INVENTION

A method is disclosed for detecting repairs made and data lines cut in an imaging array which includes an array of pixels for measuring radiation, and a plurality of data lines for reading data from the pixels, and a number of uncommitted data line contacts to be used for repairing shorted data lines. The method includes the steps of initializing the pixels of the imaging array, determining a signal level for the data lines that have not been cut, measuring a signal level of each data line in the array, and determining if the signal level for each data line is equivalent to the uncut data line signal level.

The above described method eliminates the need for shipping remapping information files with repaired detectors. In addition, the possibility that the media containing the remapping information file is compromised during shipping of the imaging array is eliminated.

DETAILED DESCRIPTION OF THE INVENTION

Figure 1:
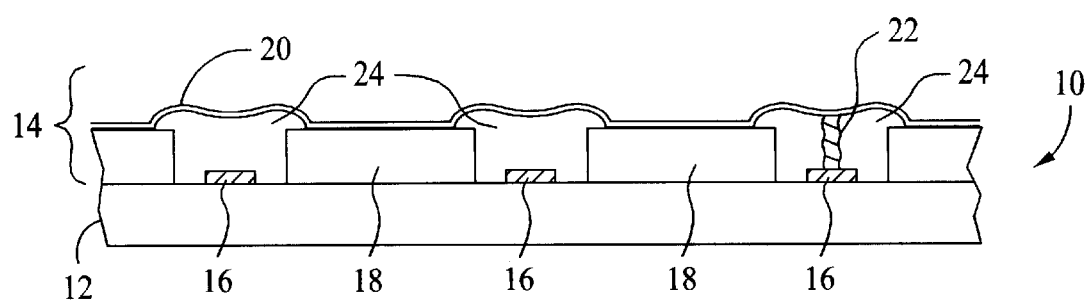
FIG. 1 is a cross-sectional view of a portion of an imager assembly having an undesired conductive path between a data line and a scan line in the array.

In one embodiment and referring to FIG. 1, a radiation imager assembly 10, for example, an x-ray imager, typically comprises a substrate 12 on which a pixel array, sometimes called a photosensor array 14 is disposed. Photosensor array 14 includes a plurality of electronic components, such as scan lines 16, photodiodes 18, and switching devices including field effect transistors (FETs) (not shown in FIG. 1). FETs are disposed to selectively couple respective photodiodes 18 to selected data lines 20. Imager assembly 10 is an x- y- addressed imager. More specifically, a plurality of scan lines 16 for addressing individual pixels (not shown) in photosensor array 14 includes a plurality of data lines 20 (FIG. 2), and a plurality of scan lines 16. Each data line 20 is oriented substantially along a first axis of imager assembly 10, and each scan line 16 is oriented substantially along a second axis of imager assembly 10. The first and second axes of imager assembly 10 are disposed substantially perpendicular to one another. For ease of illustration in FIG. 2, only a few of data lines 20 and scan lines 16 are shown extending across photosensor array 14, although each set of scan lines 16 extend across photosensor array 14. Scan lines 16 and data lines 20 are arranged in rows and columns so that single pixels in photosensor array 14 are addressable by one scan line 16 and one data line 20. Scan lines 16 comprise a conductive material, such as molybdenum, aluminum, or the like. Photodiodes 18 (not shown in FIG. 2) are electrically coupled to data lines 20 via the FETs (not shown in FIG. 2). Only a portion of each photodiode 18 is illustrated in the particular cross section of FIG. 1; photodiodes 18 comprise the active portion of the array that is responsive to incident photons and that produces the electric signals corresponding to the detected incident light. X-ray energy is converted to light energy by passing through a layer of phosphor (not shown), such as cesium iodide which is normally disposed near the surface of photodiodes 18. Each photodiode 18 comprises a layer of intrinsic amorphous silicon disposed between a layer of silicon doped to exhibit p type conductivity and a layer of silicon doped to exhibit n type conductivity.

Figure 2:
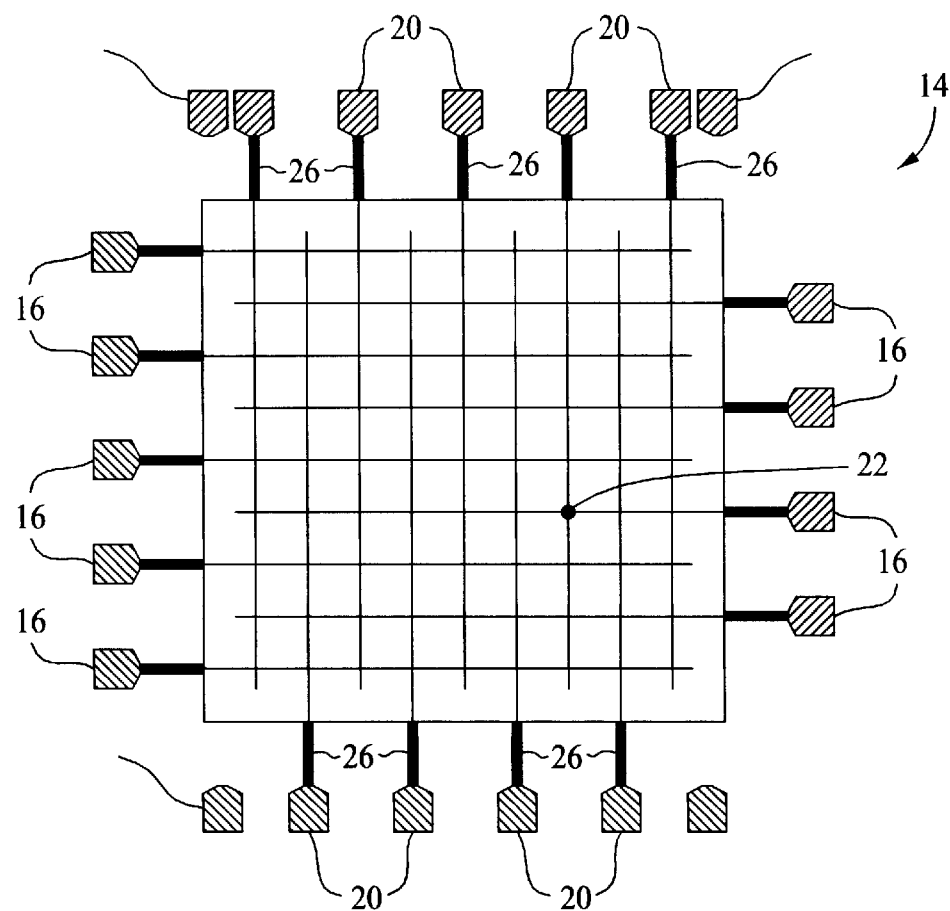
FIG. 2 is a plan view of a photosensor array having scan lines and data lines with a plurality of electrical contact pads along its edges.

A representative short circuit condition is illustrated in FIGS. 1 and 2. The short circuit condition results from, for example, a defect 22 in dielectric material 24 that comprises an impurity in the dielectric material 24. Typically an electrically conductive material that became entrained with deposited dielectric material 24 as it was deposited, or as an artifact from the deposition of other components in the photosensor array 14. As illustrated in FIGS. 1 and 2, defect 22 is disposed such that it is electrically coupled to data line 20 and to scan line 16 such that a conductive path between scan line 16 and data line 20 exists. Such a conductive path is undesired as it shorts two conductive layers together, degrading the signal generated by pixels coupled to that data line 20 and scan line 16. Until such time as the short to affected scan line 16 is isolated, operation of the whole photosensor array 14 is degraded. Uncompromised data lines 26 are shown for illustration purposes.

Figure 3:
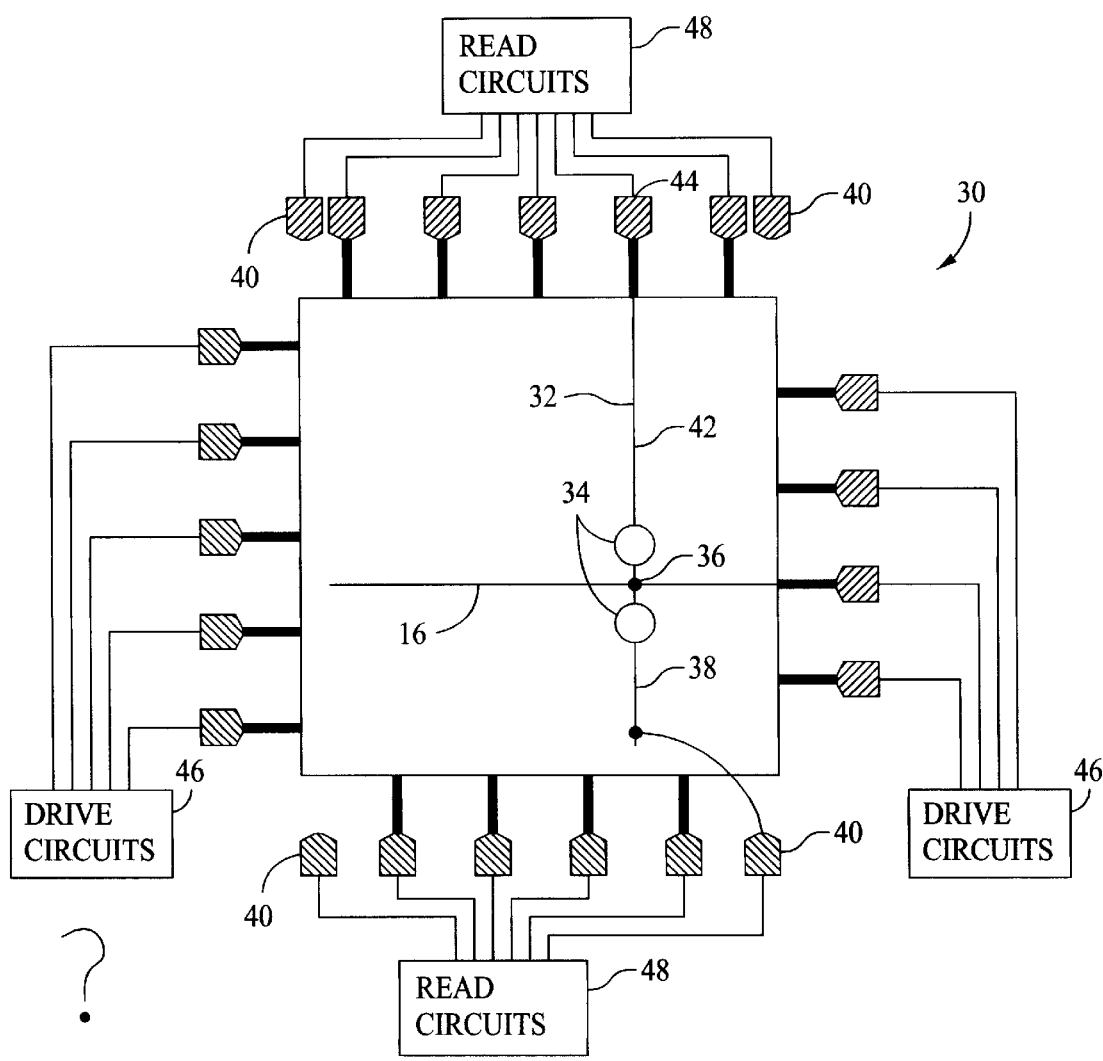
FIG. 3 is a plan view of a photosensor array showing one scan line and one data line that has been repaired with the free end of the data line connected to an uncommitted contact.

A "repaired" portion of a photosensor array 30 with a "repaired" data line 32 is illustrated in FIG. 3. Cuts 34 are on each side of defect 36. A "free" end of cut data line 38 is electrically connected to an uncommitted contact 40. Shortened data line 42 is connected to its respective contact 44 as always. Drive circuits 46 are connected to scan lines 16 (shown in FIG. 2) and enable photosensor array 30, allowing read circuits 48 to read the data present on data lines 20 (shown in FIG. 2).

Figure 4:
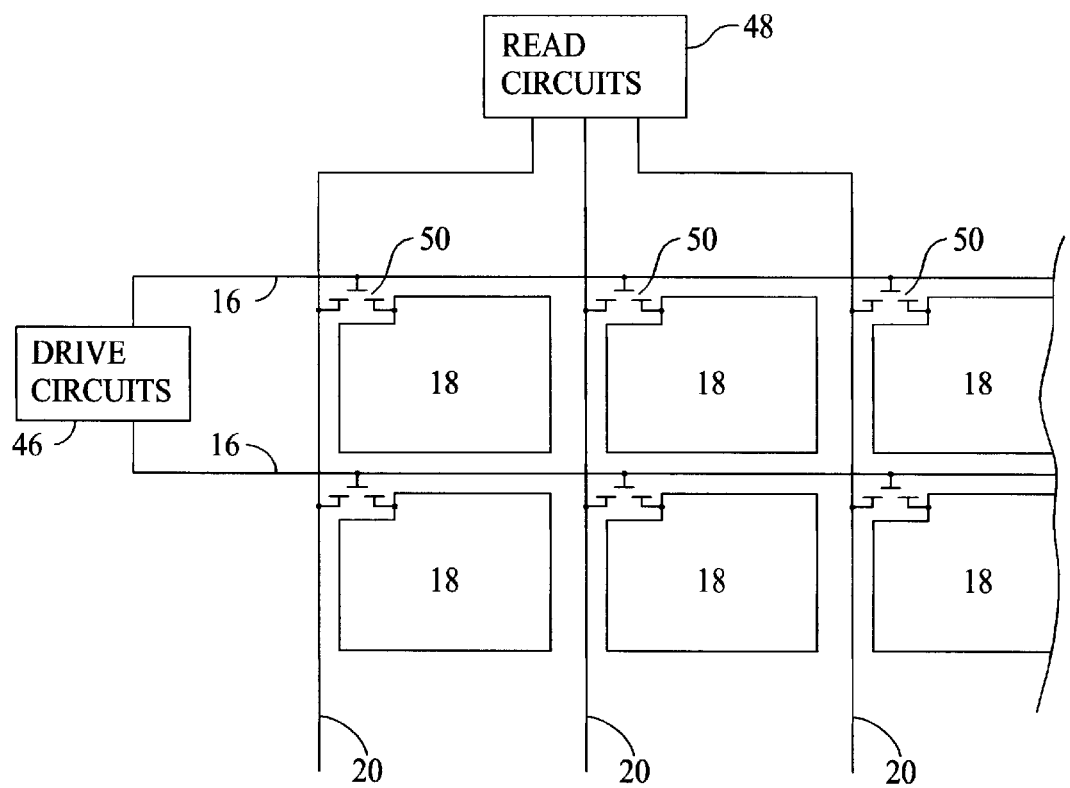
FIG. 4 is a schematic view of a photosensor array having scan lines, data lines, photodiodes and thin film transistors.

Referring to FIG. 4, data lines 20 (also shown in FIG. 1 and 2) that have been cut are detected, in one embodiment, by an artifact prevalent in amorphous silicon FETs 50 known as charge retention. Scanning a dark (or offset) image in the absence of X-Ray and light (i.e. a dark scan) results in a signal that is slightly negative. This negative charge is "retained" by the FET 50 in the panel from when it is turned on, or scanned. Retained charge leaks out slowly over time and adds a positive signal to pixels that are read or scanned later in time. The net effect is a slightly negative offset. When a data line 20 is cut, sense electronics register no offset. Therefore a sense electronics channel connected to an uncommitted contact 40 (shown in FIG. 3) or shortened data line 42 (shown in FIG. 3) reports a slightly higher signal level, than a channel connected to an uncompromised data line 26 (shown in FIG. 2). A "natural" offset of each channel is determined by keeping FETs 50 on the panel off and acquiring an image. When FETs 50 are turned on by drive circuits 46 (shown in FIG. 3) during the acquisition of a dark image, those channels that are connected to an uncompromised data line 26 will report a slightly lower signal level to read circuits 48 (shown in FIG. 3) in a dark image than in a "FET off" image. Gain and conversion parameters are selected to accentuate a difference between connected and unconnected data lines. Shortened data lines 42 (shown in FIG. 3) can be determined by examining data along the data lines 20 using read circuits 48. If a step in signal level exists as data along each data line 20 is examined, then it is deduced that a cut 34 (shown in FIG. 3) has been made in that data line. A portion of the data line 20 that has a higher average signal level is a cut portion from a sense electronic channel that normally services the cut data line. Channels that are connected to normally uncommitted contacts 40 (shown in FIG. 3) are examined in a similar manner. Because only "local" uncommitted contacts 40 are used for recovery, only a small number of channels need to be examined for a step complementary to one discovered in a cut data line.

In one embodiment uncommitted contact channels are examined first, so that an exact number of cuts in a group, which is a subset of the radiation imager assembly 10, can be determined without having to examine every line in the group.

As illustrated in FIG. 3, an uncommitted contact 40 is electrically connected to a free end of cut data line 38. If no uncommitted contacts 40 for a group appears to have "image" data present, i.e. a lower offset value, that group is skipped entirely. Similarly, when a match for each used uncommitted contact 40 (now repair) channel is found in a group, matching for that group is complete, even if all data lines in that group have not been examined. Data from a "lower" average value portion of the uncommitted contact channel is used to replace data in a "higher" average value portion of cut data line. A repaired data line 32 (shown in FIG. 3) is correlated with great certainty to an uncommitted contact 40 by a position of a "step" in data along the uncommitted contact 40 channel used for repair.

In one embodiment, a rule defining an ordering in which shorts between repaired data lines 32 and uncommitted contacts 40 are made is applied during a recovery portion of test and repair. Application of this rule makes it possible to determine, with certainty, associations between cut data lines and uncommitted contact channels when two even (or two odd) data lines belonging to a single pattern are cut at the same scan line 16 (shown in FIGS. 1, 2, and 3).

In another embodiment, rather than using retained charge to determine connectivity, a parasitic capacitance that exists between each scan line and every data line is used to induce a signal level on sense electronics by stretching a period that the FET is turned on past a time when the sense electronics takes its sample. An effect resulting from parasitic capacitance is large enough to drive the sense electronics much more negative than a nominal charge retention effect. Channels connected to data lines (or portions thereof) appear as black lines. As a result, channels not connected to data lines return a nominal "natural" offset, or signal level of that channel of the sense electronics.

From the preceding description of various embodiments of the present invention, it is evident that the need for shipping remapping information files with a repaired detector is eliminated. In addition, detectors are independent of the imaging systems since the repair file no longer needs to accompany a detector if it is not always to be connected to the same system for its entire useful life.

Although the invention has been described and illustrated in detail, it is to be clearly understood that the same is intended by way of illustration and example only and is not to be taken by way of limitation. Accordingly, the spirit and scope of the invention are to be limited only by the terms of the appended claims and their equivalents.

What is claimed is:

1. A method for detecting cut data lines in an imaging array having a detector including an array of pixels for measuring radiation and a plurality of data line contacts, said method comprising the steps of:
   initializing pixels of the imaging array which includes a plurality of data lines including at least one uncut data line and at least one cut data line, wherein each cut data line is electrically connected to at least one of the plurality of data line contacts and at least one uncommitted contact;
   determining a signal level for the uncut data line;
   measuring a signal level of each data line in the plurality of data lines; and
   determining if the signal level received from each data line in the plurality of data lines is equivalent to the uncut data line signal level.

2. A method according to claim 1 wherein said step of initializing the pixels of the imaging array comprises the step of performing a dark scan.

3. A method according to claim 1 further comprising the step of determining a signal level at each data line contact due to an amount of charge retained by a field effect transistor in the pixel array in the initialization of the pixel array.

4. A method according to claim 1 further comprising the step of determining a signal level at each data line contact due to parasitic capacitance between each data line and a scan line of the pixel array and induced by stretching a period that a FET is turned on past a time when a sense electronics takes a sample.

5. A method according to claim 1 further comprising the step of determining a number of cut data lines.

6. A method according to claim 5 wherein said step of determining a number of cut data lines comprises the step of subtracting, from the total number of data lines, a number of data lines having a signal level for uncut data lines.

7. A method according to claim 5 further comprising the step of applying a previously defined rule defining an order in which uncommitted contacts are used in a recovery portion of test and repair.

8. A method according to claim 1 further comprising the step of selecting gain and conversion parameters selected to accentuate a difference in signal levels measured at data line contacts for cut and uncut data lines.

9. A method of determining the number of cut data lines in an imaging array, the imaging array having a detector including an array of pixels for measuring radiation and a plurality of data line contacts, said method comprising the steps of:
   initializing pixels of the imaging array which includes a plurality of data lines including at least one uncut data line and at least one cut data line, wherein each cut data line is electrically connected to at least one of the plurality of data line contacts and at least one uncommitted contact;
   determining a signal level for the at least one cut data line;
   measuring a signal level of each uncommitted contact;
   determining if a number of uncommitted contacts have a signal level equivalent to the cut data line signal level of the at least one cut data line; and
   subtracting the number of uncommitted contacts having a signal level equivalent to the at least one uncut data line signal level from a total number of uncommitted contacts.

10. A method according to claim 9 wherein said step of initializing the pixels of the imaging array comprises the step of performing a dark scan.

11. A method according to claim 10 further comprising the step of determining a signal level at each data line contact based on an amount of charge retained by a field effect transistor in the imaging array in the initialization of the pixel array.

12. A method according to claim 10 further comprising the step of determining a signal level at each data line contact due to parasitic capacitance between each data line and scan line of the pixel array and induced by stretching a period that the FET is turned on past a time when the sense electronics takes its sample when the scan line is actuated.

13. A method according to claim 9 further comprising the step of selecting gain and conversion parameters to accentuate the difference between uncut data lines and unused uncommitted contacts.

14. A method according to claim 13 further comprising the step of applying a rule defining an order in which the uncommitted contacts are used in a recovery portion of test and repair.

15. An imaging system for generating an image of an object, said imaging system comprising an imaging array comprising an array of pixels for measuring radiation, said imaging system adapted to detect cut data lines in said imaging array by being configured to:
   initialize the pixels of the array which includes a first set of data lines including at least one of a second set of uncut data lines and a third set of cut data lines, the first set of data lines for reading data from the pixels, a plurality of data line contacts, each data line contact electrically connected to one of the data lines, a plurality of uncommitted contacts, and at least one uncommitted contact connected electrically to one of the cut data lines;
   determine a signal level for the second set of uncut data lines;
   measure a signal level of each data line in the first set of data lines; and
   determine if the signal level for each data line in the first set of data lines is equivalent to the uncut data line signal level.

16. An imaging system according to claim 15 further configured to initialize the pixels of the array by performing a dark scan.

17. An imaging system according to claim 15 further configured to determine a number of cut data lines.

18. An imaging system according to claim 17 further configured to determine a number of cut data lines by subtracting the number of data lines in the second set from the number of data lines in the first set.

19. An imaging system according to claim 15 further configured to determine a signal level at each data line contact where the signal level is based on an amount of charge retained by a field effect transistor in the pixel array in the initialization of the pixel array.

20. An imaging system according to claim 19 further configured with gain and conversion parameters selected to accentuate a difference in signal levels measured at data line contacts for cut and uncut data lines.

21. An imaging system according to claim 15 further configured to determining a signal level at each data line contact due to parasitic capacitance between each data line and scan line of the pixel array and induced by stretching a period that the FET is turned on past a time when the sense electronics takes its sample when the scan line is actuated.

22. An imaging system according to claim 15 further configured to subtract the number of uncommitted contacts with a signal level not equivalent to the signal level of the second set of uncut data lines from a total number of uncommitted contacts.

23. An imaging system according to claim 15 further configured to move spatially displaced image data collected from cut data lines connected to uncommitted contacts to a correct location in the image.

* * * * *